J. W. WATSON.
ADJUSTABLE HAND DISK CULTIVATOR.
APPLICATION FILED JULY 5, 1907.
901,221.  Patented Oct. 13, 1908.
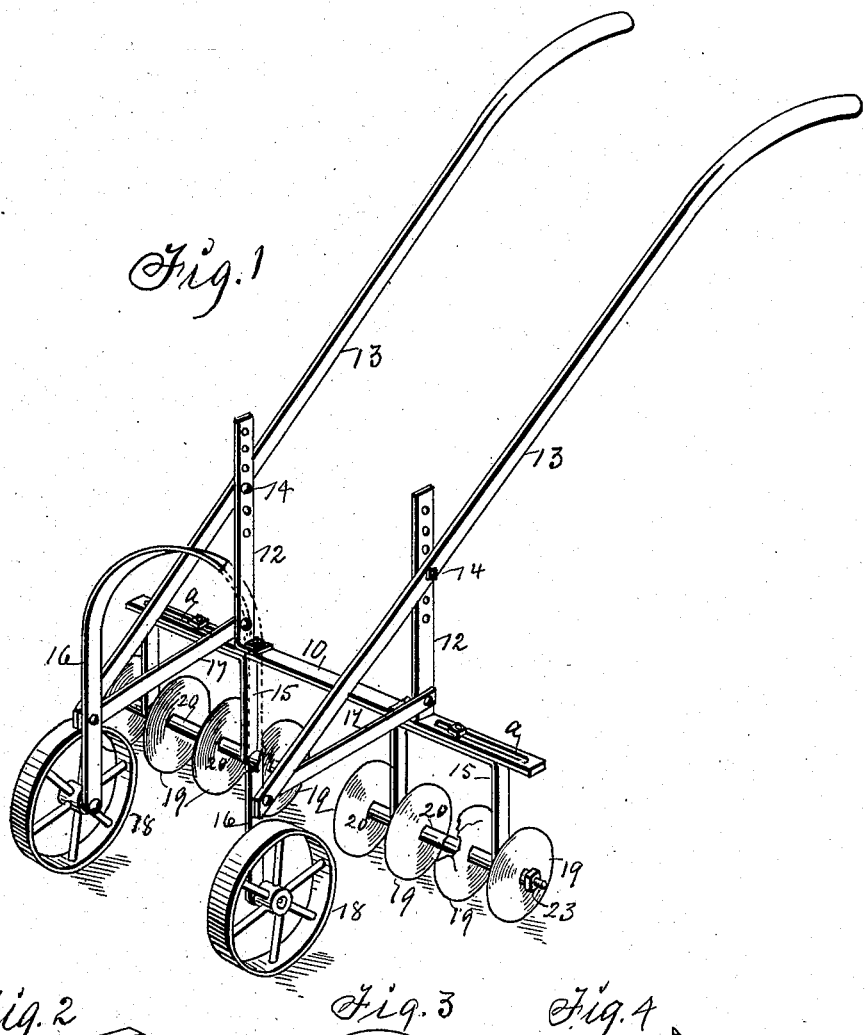
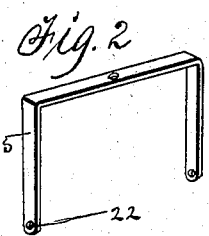
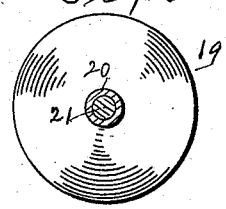
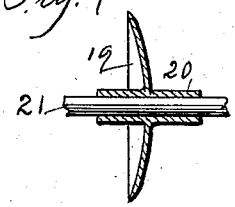

UNITED STATES PATENT OFFICE.

JOHN W. WATSON, OF NEWTON, IOWA.

ADJUSTABLE HAND DISK CULTIVATOR.

No. 901,221.    Specification of Letters Patent.    Patented Oct. 13, 1908.

Application filed July 5, 1907. Serial No. 382,399.

*To all whom it may concern:*

Be it known that I, JOHN W. WATSON, a citizen of the United States, residing at Newton, in the county of Jasper and State of Iowa, have invented a new and useful Adjustable Hand Disk Cultivator, of which the following is a specification.

The object of my invention is, first, to provide an adjustable disk cultivator specially adapted to be advantageously operated by hand in a garden or field: second, to provide means for adjusting the handles as required to be adapted for a tall or short person: third, to provide disks with hollow hubs to be adjustably, reversibly and interchangeably mounted on rods in a carriage frame: fourth, in combining the disk carrying frames with the main carriage frame so they can be readily adjusted in and out relative to a row of plants on which the cultivator is advanced.

My invention consists in the construction of an adjustable and separable carriage frame and the arrangement and combination of carriage wheels, handles, disk carriers and detachable, adjustable and reversible concavo-convex disks as hereinafter set forth, pointed out in my claims and illustrated in the accompanying drawings, in which:

Figure 1 is a perspective view of the machine that shows the forms and positions of all the adjustable parts relative to each other and the main frame. Fig. 2 is an edge view of one of the disk carriers. Fig. 3 is a face view of the convex side of one of the disks and Fig. 4 is a transverse sectional view of the same disk.

The numeral 10 designates the metal cross bar of the main frame that may vary in size and weight as desired. It has longitudinal slots $a$ in its end portions and standards 12 fixed on its top near the inner ends of the slots. The standards are provided with pluralities of coinciding bolt holes for pivotally adjustably and detachably connecting handles 13 therewith, by means of bolts 14, as shown in Fig. 1.

Three-sided metal frames 15 are pivotally adjustably and detachably connected in alinement with the slotted ends of the cross bar 10 to serve as disk carriers. An arched axle 16 is detachably connected with the lower ends of the standards 12 by straight bars 17 and bolts and nuts and said bars 17 are pivotally connected with the standards 12.

The handles 13 and the bars 17 are jointly and detachably fixed to the end portions of the arched axle 16 and wheels 18 are journaled to the lower ends of the arched axle 16 as required to complete the tractable carriage.

To adjustably, reversibly, interchangeably and detachably connect concavo-convex disks 19 with the disk carriers 15 the disks are provided with fixed hollow hubs 20 that may vary in length and they are rotatably, reversibly interchangeably and detachably mounted on rods or axles 21 that are extended through bearings 22 in the lower ends of the disk carriers and detachably secured therein by nuts 23 on their ends, as shown in Fig. 2, or in any suitable way as required to locate them at different distances relative to each other at different times.

In the practical operation of my invention it is obvious all the parts can be readily disconnected from each other as required to facilitate storing, boxing and shipping and economizing space and expense for freight. It is obvious also, that the disks may be reversed as required for moving loose ground towards or away from a row of plants that is strided by the cultivator when in practical use. It is also obvious that the number of disks in the disk carriers may vary as desired and the disk carriers adjusted relative to a row of plants as the plants grow larger and the inner disks are required to be moved away from the plants. It is also obvious the handles can be raised or lowered to suit the size of the operator, boy or man.

Having thus set forth the purposes of my invention and its construction and manner of operation the practical advantages and utility thereof will be readily understood by gardeners and farmers.

What I claim as new and desire to secure by Letters-Patent, is:—

1. In a disk cultivator, the combination of a cross bar having longitudinal slots in its end portions, parallel standards at the inner ends of the slots and each having a plurality of bolt holes, an arched axle connected with the standards, handles adjustably connected with the standards and pivotally connected with the arched axle, as set forth.

2. In a disk cultivator, the combination of a cross bar having longitudinal slots in its end portions, parallel standards at the inner ends of the slots each having a plurality of bolt holes, an arched axle connected with the standards, handles adjustably connected with the standards and pivotally connected with the arched axle, adjustable disk carriers, axles in the disk carriers and disks on the axles, to operate as set forth.

3. A disk cultivator comprising a frame composed of a cross bar having slots in its end portions and standards having coinciding bolt holes, an arched axle carrying wheels, bars connecting the arched axle with the standards on the cross bar, handles connected with the standards and the arched axle, disk carriers connected with slotted ends of the cross bar, axles in the disk carriers and disks rotatably mounted on said axles in the disk carriers, arranged and combined to operate as set forth for the purposes stated.

JOHN W. WATSON.

Witnesses:
 JOE HORN,
 RAY B. GIBFORD.